(12) United States Patent
Sapozhnikov et al.

(10) Patent No.: US 12,512,119 B1
(45) Date of Patent: Dec. 30, 2025

(54) READER WITH LINEARIZING BIAS CURRENT

(71) Applicant: SEAGATE TECHNOLOGY LLC, Fremont, CA (US)

(72) Inventors: Victor Sapozhnikov, Minnetonka, MN (US); Mohammed Sharia Ullah Patwari, Edina, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 19/043,866

(22) Filed: Feb. 3, 2025

(51) Int. Cl.
*G11B 5/39* (2006.01)
*G11B 5/012* (2006.01)
*G11B 5/02* (2006.01)
*G11B 5/00* (2006.01)

(52) U.S. Cl.
CPC ............. *G11B 5/012* (2013.01); *G11B 5/02* (2013.01); *G11B 2005/0008* (2013.01); *G11B 2005/0018* (2013.01)

(58) Field of Classification Search
CPC . G11B 5/3932; G11B 5/3909; G11B 5/39012; G11B 2005/3996; G11B 5/3967; G11B 2005/0024
USPC ........................................................ 360/322
See application file for complete search history.

(56) References Cited

U.S. PATENT DOCUMENTS

2003/0030934 A1* 2/2003 Schaff ................ G11B 20/1816

* cited by examiner

*Primary Examiner* — Nabil Z Hindi
(74) *Attorney, Agent, or Firm* — Mueting Raasch Group

(57) ABSTRACT

Disclosed are methods for linearizing the response of a non-linear magnetic reader, for example in the operation of a hard disk drive. Magnetic readers generally exhibit non-linearities in their response to an applied magnetic field, and those non-linearities may be particularly pronounced when the field strength is high. This deviation from linearity at larger field strengths can limit the useful range of field amplitudes. To expand the useful range of field amplitudes and thereby increase the available signal at the reader, the reader bias current may be varied in such a way to compensate for the natural non-linearity of the reader, thus making the reader output signal linear over a larger range of detected field strengths.

19 Claims, 5 Drawing Sheets

READER WITH LINEARIZING BIAS CURRENT

TECHNICAL FIELD

The disclosure relates to readers for magnetic recording and techniques for the same, particularly for use in hard disk drives.

SUMMARY

In certain aspects, the present disclosure provides methods for use with a hard drive that includes a reader for reading a data track from a magnetic storage medium by detecting magnetic field strength, where the reader exhibits a linear response over a first range of field strengths and exhibits a non-linear response over a second range of field strengths. Such methods include adjusting a bias current of the reader to compensate for the non-linear response, thereby producing an approximately linear response over the first and second ranges of field strengths, and reading the data track from the magnetic storage medium using the reader.

In certain aspects, adjusting the bias current of the reader to compensate for the non-linear response is performed according to a bias current adjustment scheme. In certain aspects, the bias current adjust scheme may include using one or more non-linear circuit elements in parallel with the bias current, and where the one or more non-linear circuit elements exhibit a non-linear behavior that is tuned to the non-linear response of the reader. The bias current adjust scheme may also include pre-reading the data track to develop an anticipatory map of field strengths. Such pre-reading may be performed using the reader or using a secondary reader.

In certain aspects, the present disclosure provides hard disk drive devices that include a recording head including a writer for writing data in a data track on a magnetic storage medium and a reader for reading data from the data track written on the magnetic storage medium, where the reader exhibits a non-linear response over a portion of a full range of field strengths, and that further include control electronics configured to vary a reader bias current to compensate for the non-linear response of the reader, thereby producing an approximately linear reader response over the full range of field strengths.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
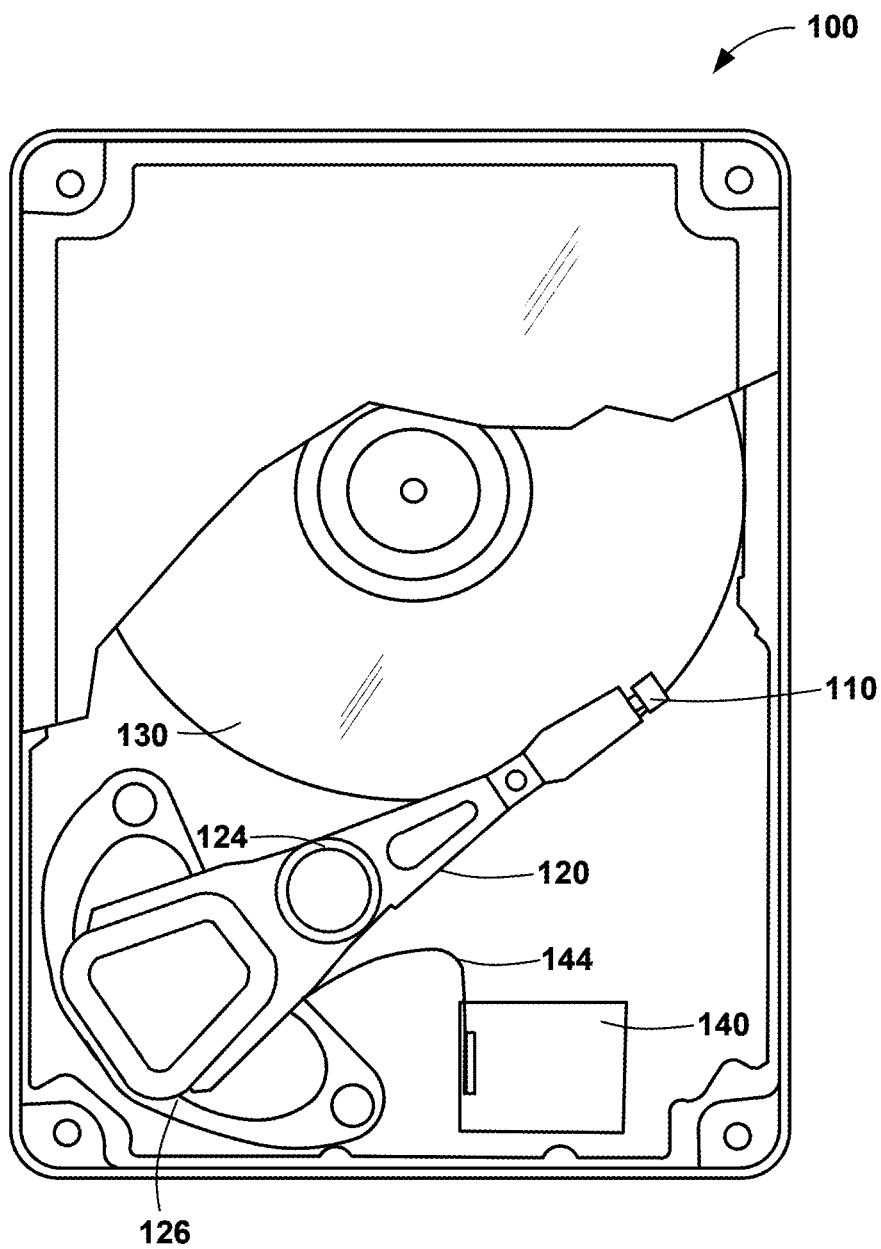
FIG. 1 is a schematic representation of a hard disk drive device that may be used in accordance with aspects of the present disclosure.

The present disclosure relates to the operation of hard disk drives (HDDs), and in particular to the operation of magnetic readers in HDDs to read magnetically recorded data from magnetic media. In general, all magnetic readers will exhibit some non-linearities in their response to an applied magnetic field, and those non-linearities may be particularly pronounced when the field strength is high, for example when the reader is hovering over a long bit. In a typical HDD, the change in reader resistance with respect to the detected field strength exhibits a high degree of linearity over a range of field strengths that are relatively small, and deviates from linearity at larger field strengths. This deviation from linearity at larger detected field strengths can limit the useful range of field amplitudes to those over which the reader sensitivity is linear. To expand the useful range of field amplitudes and thereby increase the available signal at the reader, various aspects of the present disclosure involve varying the reader bias current in such a way to compensate for the natural non-linearity of the reader, thus making the reader output signal linear over a larger range of detected field strengths.

As mentioned, reader non-linearity tends to increase with the reader signal amplitude, thus limiting the useful range of amplitudes, and correspondingly reducing the signal to noise ratio (SNR). In addition, reader non-linearity may be asymmetrical, meaning that the reader non-linearity is different for high positive field amplitudes and for high negative field amplitudes, which can present additional difficulties for the read channel. The various effects of reader non-linearity can reduce areal density capability (ADC). Therefore, as appreciated by and set forth in the present disclosure, linearizing the reader output over a wider range of reader signal amplitudes may be beneficial for SNR and ADC.

In accordance with various aspects, the present disclosure provides for varying the reader bias current to maintain reader linearity, rather than using a constant reader bias current as would be the typical mode of reader operation. As such, the reader bias current may be varied to provide a linear reader signal across a wider range of amplitudes, even though the reader itself may exhibit non-linearities or asymmetries over portions of that range. In accordance with certain aspects, the reader non-linearity may be characterized by a deviation from linearity at high signal amplitudes. This deviation from linearity may be defined by the equation $\Delta R = dR + \delta R$, where $dR$ is the linear part of the reader sensitivity and $\delta R$ is the non-linear part. Knowing $\delta R/dR$ for a given reader, the bias current can be parameterized to compensate for the reader non-linearity so that a more linear signal can be obtained across a wider useful range of amplitudes.

Because the linearizing current depends on the reader resistance, which can change very quickly in an HDD environment, a common feedback loop may introduce delays that prevent the current from being updated quickly enough to compensate for the non-linearity being detected. As such, the present disclosure provides for various techniques that can be employed to allow the linearizing current to be varied in concert with the changes in reader resistance. Such techniques may include using one or more non-linear circuit elements such as diodes and/or transistors, which may be tuned to the $\delta R/dR$ characteristics of a given reader. Such techniques may also include pre-reading a track to thereby develop an anticipatory map of the media field, and thus of what the linearizing current will need to be.

Reference will now be made to the drawings, which depict one or more aspects described in this disclosure. However, it will be understood that other aspects not depicted in the drawings fall within the scope of this disclosure. Like numbers used in the figures refer to like components, steps, and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar. It will also be appreciated that the drawings are meant to illustrate certain aspects and arrangements of features in a way that contributes to their understanding, and are not meant to be scale drawings that accurately represent size or shape of elements. Likewise, the use of drawings or charts is meant to elucidate certain aspects and concepts without being bound to exactitude or to any theory.

FIG. 1 schematically depicts a typical hard disk drive (HDD) device 100 that includes a recording head (also referred to as a slider) 110 disposed on the end of an actuator arm 120 that is rotationally movable around a pivot 124, for example by use of a voice coil motor (VCM) 126. The recording head 110 is positioned in close proximity to the surface of magnetic media disk(s) 130 such that the recording head 110 can write data to and read data from tracks on the magnetic media 130 as the media spins by action of a spindle motor (not indicated). In many HDDs, the magnetic media 130 is provided as a stack of disks having recording surfaces that are accessed by recording heads provided on the ends of stacked actuator arms, the actuator arms being interleaved between the disks. For simplicity, FIG. 1 illustrates a single disk 130, actuator arm 120, and recording head 110.

Electronics for conditioning signals to and from the recording head 110 may be included on or close to the recording head 110. Such signal-conditioning electronics may include preamp circuitry and read channel circuitry. Controller electronics 140 may be connected to VCM 126 and recording head 110 via a flex cable 144 that connects to traces on the actuator arm 120. Controller electronics 140 may also control the spinning of the media disk 130. HDD device 100 may operate on any magnetic recording principle, whether that be conventional magnetic recording (CMR), shingled magnetic recording (SMR), heat-assisted magnetic recording (HAMR), or any other type of recording technique and combinations thereof. While the actuator 120 is shown to move rotationally, the present disclosure is not limited to how the actuator moves and encompasses linear actuation. Likewise, recording head 110 can be provided on movable or stationary rails, or in any other suitable manner now known or later contemplated.

Figure 2:
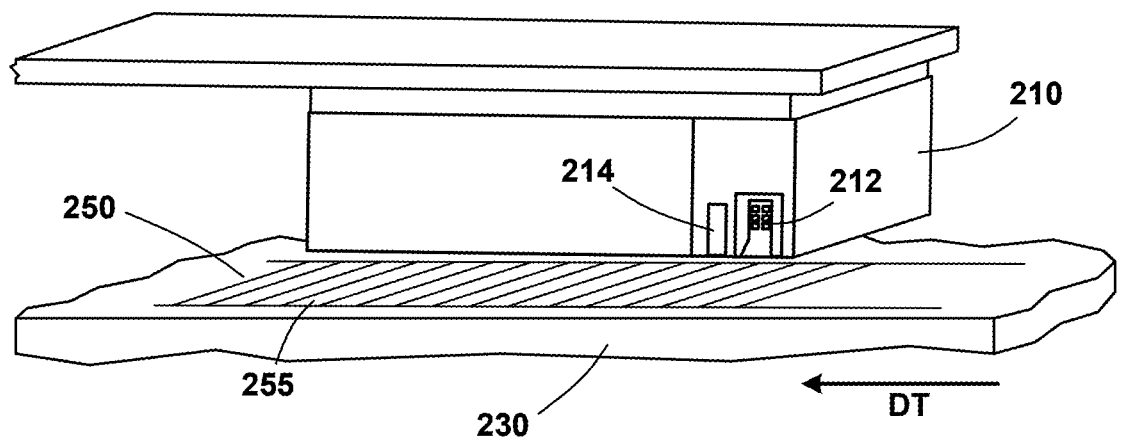
FIG. 2 is a schematic representation of an example recording head for writing data to and reading data from a magnetic recording medium, as may be used in accordance with aspects of the present disclosure.

FIG. 2 shows a schematic perspective view of a magnetic recording head 210 that incorporates a writer 212 and a reader 214 disposed over a recording surface of a magnetic recording medium 230. Data track 250 includes bits 255 being read by reader 214 as the medium 230 is moved underneath the recording head 210 in a down-track (DT) direction, indicated by the arrow. In certain embodiments, recording head 210 may include a single reader or may include multiple readers. The inclusion of one or more additional readers may be employed for pre-reading adjacent tracks, for detecting intertrack interference and other interference effects, for removing skew, and so forth. In accordance with the present disclosure, a second reader may be used to pre-read an upcoming track to assist in adjusting the bias current in the primary reader during reading of the that track by the primary reader. In certain embodiments, for example embodiments that employ a single reader, pre-reading and reading may be done using the same reader, in which case multiple passes would be required to read a single track.

As the media disk 230 spins, the magnetic field from stored data bits 255 electrifies the reader 214, and the reader 214 in turn converts those voltages into analog signals. A preamplifier (not shown) strengthens the signal before referring it to a dedicated analog-to-digital converter (not shown). That converter assesses the analog signal amplitude at consistent intervals and assigns it a digital value. The digitized signals undergo further processing to detect or correct errors. A read channel (not shown) then decodes the processed signals and translates them into a digital form that can be communicated to a host via an appropriate interface. A bias current is applied to the reader during operation, which is conventionally a constant DC current meant to establish a stable operating point and to ensure consistent and accurate reading of data from magnetic media 230 by keeping the reader 214 in a predetermined magnetic state. In accordance with aspects of the present disclosure, instead of maintaining a constant bias current, the reader bias current is varied to maintain linearity of the reader 214 across a wider range of signal amplitudes. This is accomplished by compensating for the natural non-linearity of the reader 214.

Figure 3A:
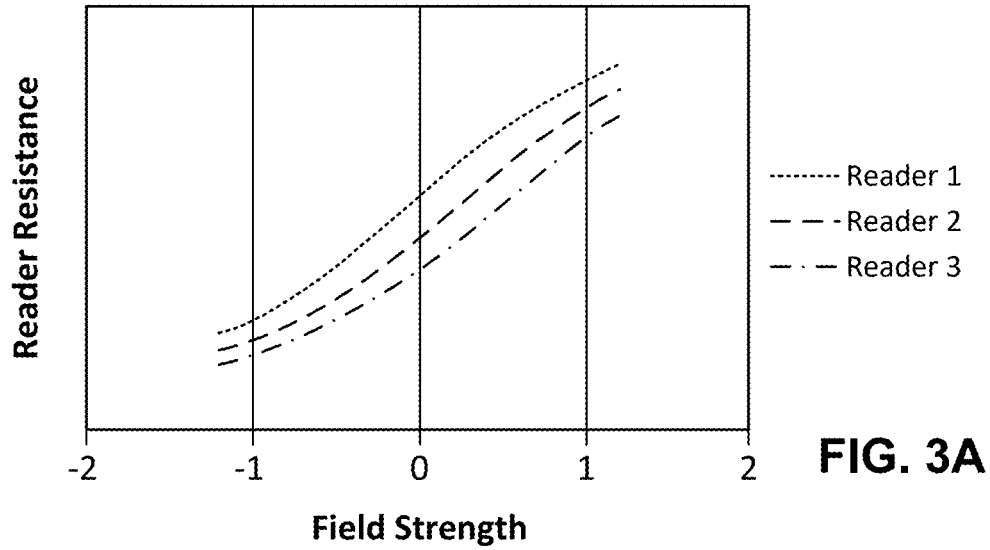
FIG. 3A and FIG. 3B are charts showing non-linearities in reader response with respect to magnetic field strength.

FIG. 3A shows a chart of reader resistance versus field strength (both given in arbitrary units) for three example readers, each exhibiting a different response curve having non-linearities for larger field strengths and showing a linear or near linear response for smaller field strengths. While the response curves may be similar, each reader will generally have a unique response curve. For a given reader, the non-linearities at high negative fields may mirror the non-linearities at high positive fields, resulting in a symmetric reader response. In other cases, the reader may exhibit non-linearities that are different at high negative fields as compared to high positive fields, resulting in an asymmetric reader response.

Figure 3B:
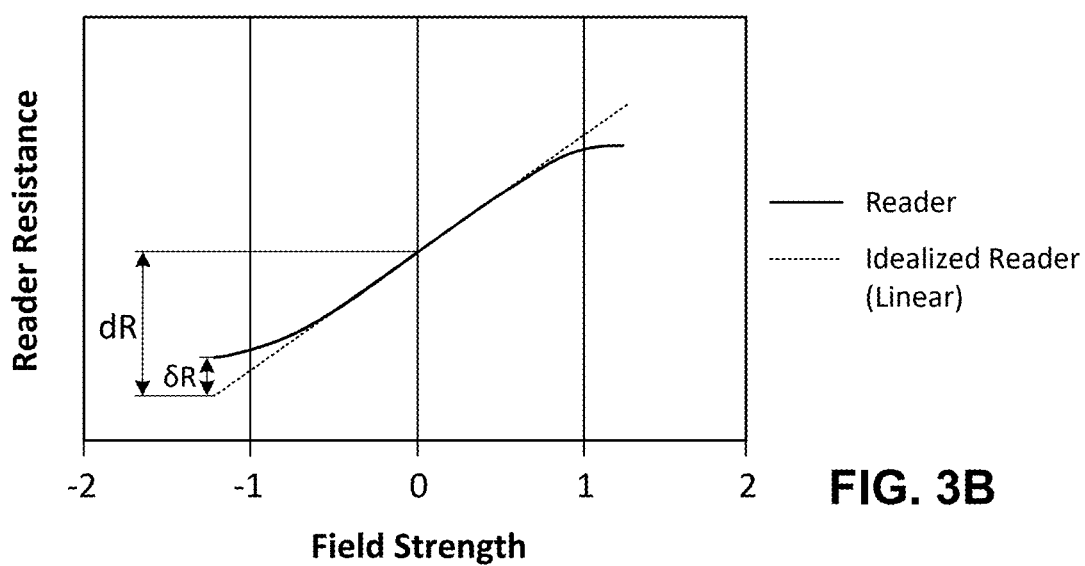

FIG. 3B shows a resistance response curve for a roughly symmetric reader that exhibits non-linear response at higher field strengths. The non-linear character of the reader response may be defined in terms of an idealized reader that exhibits a linear response over the entire range of field strengths. The slope of the idealized linear reader response gives a difference in reader resistance, dR, between zero field strength and a field strength of interest, which in this instance is the highest negative field strength. The non-linear correction, δR, is the difference between the real reader resistance and the idealized reader's linear resistance at the field strength of interest. Thus, the resistance change of the real reader can be expressed as the sum of the linear part dR and the nonlinear part δR, or ΔR=dR+δR.

As mentioned, a standard design employs a constant bias current method for generating the reader signal V according to the following, where $V_b$ is the bias voltage and $R_0$ is the reader resistance at zero field.

$$V = I\Delta R = I(dR + \delta R) = \frac{V_b}{R_0}(dR + \delta R)$$

Such a constant bias current method produces a non-linear signal due to the reader non-linearity, such as shown in FIGS. 3A and 3B. In accordance with various aspects, the present disclosure provides a different approach, which linearizes the bias current rather than using a constant bias current. Accordingly, the bias current may be varied according to the following equation, where I is the variable bias current and $I_0$ is a constant, baseline bias current:

$$I = I_0 \frac{dR}{dR + \delta R} = I_0 \frac{1}{1 + \delta R/dR}$$

The variable current I compensates for the natural non-linearity of the reader, and thus creates a linear, or near linear, reader signal even though the reader itself is non-linear.

$$V = I\Delta R = I_0 \frac{dR}{dR + \delta R}(dR + \delta R) = I_0 dR$$

Thus, knowing the $\delta R/dR$ characteristics of a given reader, a linear signal may be obtained by parameterizing the bias current in accordance with the present disclosure. Also, in case the reader non-linearity is asymmetric, meaning that the non-linearity at one field strength extreme exhibits a different $\delta R$ than the non-linearity at the other field strength extreme, linearizing the bias current in accordance with the present disclosure may be expected to significantly reduce the asymmetry. In addition, a linear reader signal is easier for the read channel to handle, and may be expected to produce a lower bit error rate (BER) than for a non-linear reader signal, even if the latter has no asymmetry and the same SNR. Moreover, a higher reader signal may be obtained by allowing the free layer of the reader to rotate more in the media field than would be allowed in convention reader methodologies that do not correct for reader nonlinearity. This can be done, for example, by weakening the free layer bias field coming from the side shields.

Figure 4A:
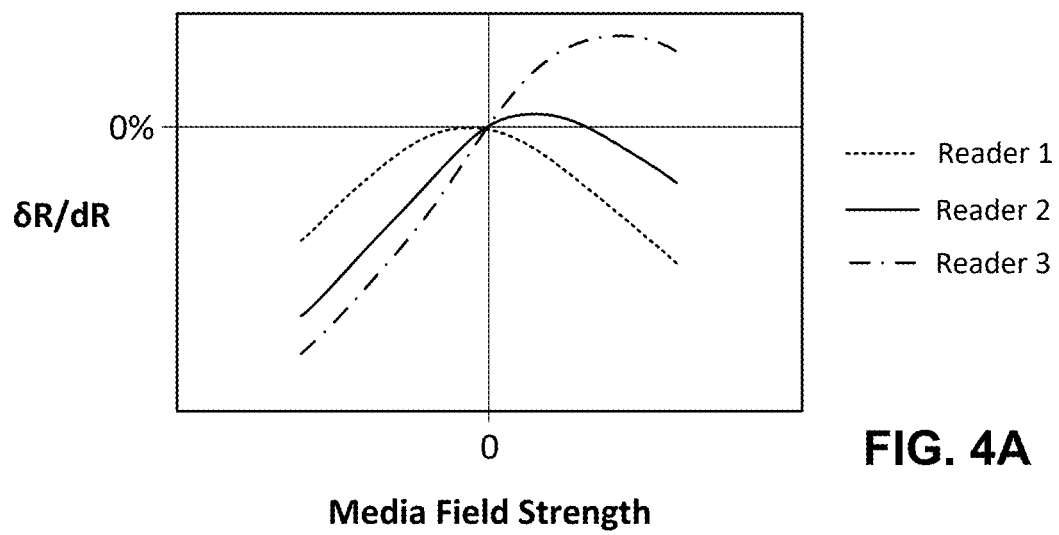
FIG. 4A and FIG. 4B are charts showing the dependence of the degree of reader non-linearity on the media field strength and on the change in reader resistance.
Figure 4B:
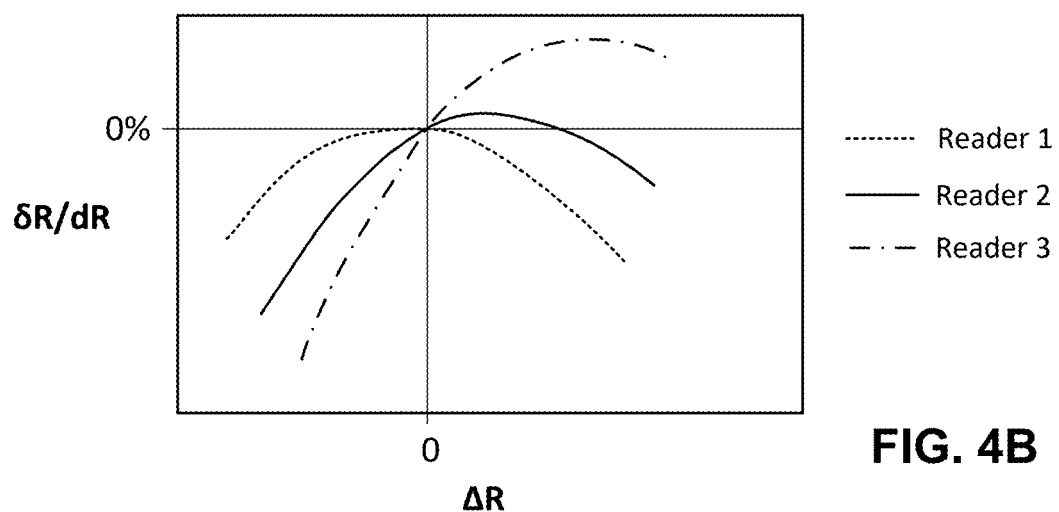

It should be noted that $\delta R/dR$ is not a constant function of field strength, and will generally vary in a non-linear fashion with the media field strength, and therefore with $\Delta R$. This can be taken into account when characterizing the $\delta R/dR$ characteristics of a given reader. To this end, FIGS. 4A and 4B are charts that indicate the nonlinearity of $\delta R/dR$ with respect to field strength (FIG. 4A) and with respect to $\Delta R$ (FIG. 4B) for three different readers. A $\delta R/dR$ that is at or near 0% indicates a reader response that is linear or near linear. A $\delta R/dR$ that is large, whether large positive or large negative, indicates a higher degree of non-linearity in the reader response. Plotting $\delta R/dR$ versus field strength and $\Delta R$ in this way magnifies the reader non-linearities and asymmetries.

In accordance with various aspects of the present disclosure, it is recognized that linearizing the reader bias current depends on the reader resistance, since the $\delta R/dR$ characteristics of a given reader depend on the reader resistance. A straightforward feedback loop in which the resistance of the load (the reader) is sensed and then used to adjust the bias current may introduce too much of a delay to be effective. In other words, in a typical HDD, the load resistance is expected to change quickly, for example at rates up to 1 GHz, and so by the time the bias current is adjusted to compensate, the resistance of the reader has already changed. In such environments where feedback may cause undesirable delay, systems and methods in accordance with the present disclosure may utilize a current source adjustment scheme without this type of direct feedback.

One approach may be to add circuit element(s) in parallel with the bias current source, where the circuit element(s) impart a non-linearity that is matched to the reader. Such circuit elements may include a diode or a transistor that exhibit non-linear I-V characteristics that are selected or tuned to the $\delta R/dR$ characteristics of a given reader.

Another approach to producing a linearizing current is to pre-read the data track, and use this information to anticipate what the linearizing current needs to be at each location along the track. The pre-reading may be accomplished with a secondary reader provided on the recording head, or may be accomplished with the same primary reader, in which case multiple passes of each data track would be required. Good servo systems synchronization and a high-frequency capability of the bias current producing line may be required to implement the pre-reading approach.

Figure 5:
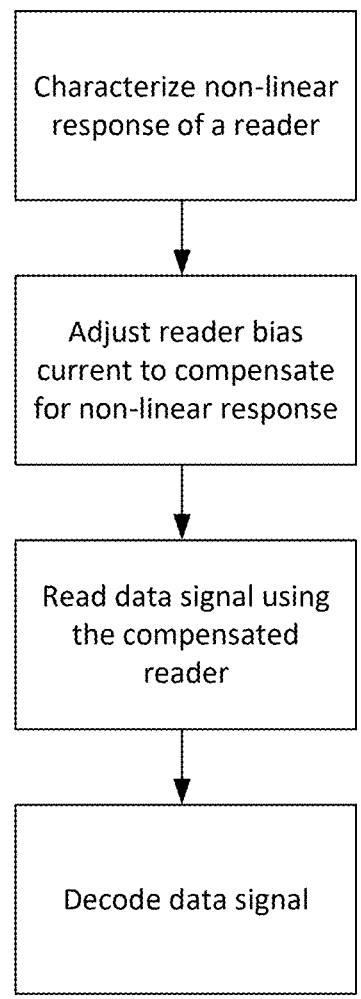
FIG. 5 is a flow chart showing steps that may be used in accordance with aspects of the present disclosure.

FIG. 5 is a flow chart summarizing various steps involved in methods for linearizing the bias current to compensate for reader non-linearities. First, the non-linear response of a given reader is characterized. Based on this characterization, the reader bias current is adjusted during reading to thereby compensate for the reader non-linear response. This compensation may produce an approximately linear response of the reader over the entire range of signal amplitudes. The data signal may then be read by the reader being operated using the linearizing bias current, and the data signal can be decoded by the read channel in a relatively straightforward manner.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (for example, all described acts or events may not be necessary to carry out the techniques). In addition, while certain aspects of this disclosure are described as being performed by a single module or unit for purposes of clarity, it should be understood that the techniques of this disclosure may be performed by a combination of units or modules.

All scientific and technical terms used herein have meanings commonly used in the art unless otherwise specified. The definitions provided herein are to facilitate understanding of certain terms used frequently herein and are not meant to limit the scope of the present disclosure.

As used herein, the term "configured to" may be used interchangeably with the terms "adapted to" or "structured to" unless the content of this disclosure clearly dictates otherwise.

As used herein, the term "or" refers to an inclusive definition, for example, to mean "and/or" unless its context of usage clearly dictates otherwise. The term "and/or" refers to one or all of the listed elements or a combination of at least two of the listed elements.

As used herein, the phrases "at least one of" and "one or more of" followed by a list of elements refers to one or more of any of the elements listed or any combination of one or more of the elements listed.

As used herein, the terms "coupled" or "connected" refer to at least two elements being attached to each other either directly or indirectly. An indirect coupling may include one or more other elements between the at least two elements being attached. Further, in one or more embodiments, one element "on" another element may be directly or indirectly on and may include intermediate components or layers therebetween. Either term may be modified by "operatively" and "operably," which may be used interchangeably, to describe that the coupling or connection is configured to allow the components to interact to carry out described or otherwise known functionality.

As used herein, any term related to position or orientation, such as "proximal," "distal," "end," "outer," "inner," and the like, refers to a relative position and does not limit the absolute orientation of an embodiment unless its context of usage clearly dictates otherwise.

The singular forms "a," "an," and "the" encompass embodiments having plural referents unless its context clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

What is claimed is:

1. A method for use with a hard drive that includes a reader for reading a data track from a magnetic storage medium by detecting magnetic field strength, where the reader exhibits a linear response over a first range of field strengths and exhibits a non-linear response over a second range of field strengths, the method comprising:
adjusting a bias current of the reader to compensate for the non-linear response, thereby producing an approximately linear response over the first and second ranges of field strengths; and
reading the data track from the magnetic storage medium using the reader.

2. The method of claim 1, further comprising characterizing the non-linear response of the reader as a deviation from the linear response of the reader.

3. The method of claim 2, wherein the deviation from the linear response of the reader varies with field strength.

4. The method of claim 1, wherein the first range includes relatively small field strengths centered around zero field strength, and the second range includes relatively high negative field strengths and relatively high positive field strengths.

5. The method of claim 4, wherein the non-linear response of the reader at relatively high negative field strengths is different than the non-linear response of the reader at relatively high positive field strength.

6. The method of claim 1, wherein adjusting the bias current of the reader to compensate for the non-linear response is performed according to a bias current adjustment scheme.

7. The method of claim 6, wherein the bias current adjustment scheme comprises using one or more non-linear circuit elements in parallel with the bias current, and where the one or more non-linear circuit elements exhibit a non-linear behavior that is tuned to the non-linear response of the reader.

8. The method of claim 7, wherein the one or more non-linear circuit elements include a diode or a transistor.

9. The method of claim 6, wherein the bias current adjustment scheme comprises pre-reading the data track to develop an anticipatory map of field strengths.

10. The method of claim 9, wherein the pre-reading is performed using the reader.

11. The method of claim 9, wherein the pre-reading is performed using a secondary reader that is different from the reader.

12. A hard disk drive comprising:
a recording head including a writer for writing data in a data track on a magnetic storage medium and a reader for reading data from the data track written on the magnetic storage medium, where the reader exhibits a non-linear response over a portion of a full range of field strengths;
control electronics configured to vary a reader bias current to compensate for the non-linear response of the reader, thereby producing an approximately linear reader response over the full range of field strengths.

13. The hard disk drive of claim 12, wherein the non-linear response of the reader varies with field strength.

14. The hard disk drive of claim 12, wherein the non-linear response of the reader is asymmetric.

15. The hard disk drive of claim 12, further comprising one or more non-linear circuit elements in parallel with the reader bias current, wherein the one or more non-linear circuit elements exhibit a non-linear behavior that is tuned to the non-linear response of the reader.

16. The hard disk drive of claim 15, wherein the one or more non-linear circuit elements include a diode or a transistor.

17. The hard disk drive of claim 12, wherein the control electronics are configured to vary the reader bias current in accordance with an anticipator map of field strengths generated by pre-reading the data track.

18. The hard disk drive of claim 17, wherein the pre-reading is performed using the reader.

19. The hard disk drive of claim 17, wherein the recording head further comprises a second reader that is different from the reader, and the pre-reading is performed using the secondary reader.

* * * * *